READOUT OF A PLANAR, APERTURED THIN-FERROMAGNETIC-FILM BY THE DEFLECTION OF ELECTRONS PASSING THERETHROUGH

Filed Nov. 12, 1964

INVENTORS
ARVID L. OLSON
HENRY N. OREDSON
ERNEST J. TOROK

BY Thomas J. Nikolai
ATTORNEY 3,434,124

READOUT OF A PLANAR, APERTURED THIN-FERROMAGNETIC-FILM BY THE DEFLECTION OF ELECTRONS PASSING THERETHROUGH

Arvid L. Olson, St. Paul, Henry N. Oredson, Ramsey, and Ernest J. Torok, Savage, Minn., assignors to Sperry Rand Corporation, New York, N.Y., a corporation of Delaware Filed Nov. 12, 1964, Ser. No. 410,468
U.S. Cl. 340—174 13 Claims
Int. Cl. G11b 5/32; H01j 25/02, 25/22

ABSTRACT OF THE DISCLOSURE

An apparatus for and a method of the nondestructive readout of a planar thin-ferromagnetic-film memory element having a central aperture therethrough whereby a beam of electrons is passed through the aperture, normal to the plane of the memory element, and the direction of deflection of such beam is detected by detectors on the far side of the memory element.

The value of the utilization of small cores of magnetizable material as logical memory elements in electronic data processing systems is well known. This value is based upon the bistable characteristic of magnetizable cores which include the ability to retain or remember magnetic conditions which may be utilized to indicate a binary "1" or a binary "0." As the use of magnetizable cores in electronic data processing equipment increases, a primary means of improving the computational speed of these machines is to utilize memory elements which possess the property of nondestructive readout, for by retaining the initial state of remanent magnetization after readout the rewrite cycle required with destructive readout devices is eliminated. As used herein, the term "nondestructive readout" shall refer to the sensing of the relative directional-state of the remanent magnetization of a magnetizable core without destroying or reversing such remanent magnetization. This should not be interpreted to mean that the state of the remanent magnetization of the core being sensed is not temporarily disturbed during such nondestructive readout.

Ordinary magnetizable cores and circuits utilized in destructive readout devices are now so well known that they need no special description herein. However, for purposes of the present, it should be understood that such magnetizable cores are capable of being magnetized to saturation in either of two directions. Furthermore, these cores are formed of magnetizable material selected to have a rectangular hysteresis characteristic which assures that after the core has been saturated in either direction a definite point of magnetic remanence representing the residual flux density in the core will be retained. The term "flux density" when used herein shall refer to the net external magnetic effect of a given internal magnetic state, e.g., the flux density of a demagnetized state shall be considered to be a zero or minimum flux density while that of a saturated state shall be considered to be a maximum flux density of a positive or negative magnetic sense. The residual flux density representing the point of magnetic remanence in a core possessing such characteristics is preferably of substantially the same magnitude as that of its maximum saturation flux density. These magnetic core elements are usually connected in circuits providing one or more input coils for purposes of switching the core from one magnetic state corresponding to a particular direction of saturation, i.e., positive saturation denoting a binary "1" to the other magnetic state corresponding to the opposite direction of saturation, i.e., negative saturation, denoting a binary "0". One or more output coils are usually provided to sense when the core switches from one state of saturation to the other. Switching can be achieved by passing a current pulse of sufficient amplitude through the input winding in a manner so as to set up a magnetic field in the area of the magnetizable core in a sense opposite to the pre-existing flux direction, thereby driving the core to saturation in the opposite direction of polarity, i.e., of positive to negative saturation. When the core switches, the resulting magnetic field variation induces a signal in the windings on the core such as, for example, the above mentioned output or sense winding. The material for the core may be formed of various magnetizable matreials. The terms "signal," "pulse," etc., when used herein shall be used interchangeably to refer to the current signal that produces the corresponding magnetic field and to the magnetic field produced by the corresponding current signal.

One technique of achieving destructive readout of a toroidal bistable memory core is that of the well-known coincident current technique. This method utilizes the switching threshold characteristic of a core, having a substantially rectangular hysteresis characteristic. In this technique, a minimum of two interrogate, or read, lines thread the core's central aperture, each interrogate line setting up a magnetomotive force in the memory core of one half of the magnetomotive force necessary to completely switch the memory core from a first to a second and opposite magnetic state while the magnetomotive force set up by each separate interrogate winding is of insufficient magnitude to effect a substantial change in the memory core's magnetic state. A sense winding threads the core's central aperture and detects the memory core's substantial or insubstantial magnetic state change as an indication of the information stored therein.

One technique of achieving nondestructive readout of a magnetic memory core is that disclosed in the article, "Nondestructive Sensing of Magnetic Cores," Transactions of the AIEE, Communications on Electronics, Buck and Frank, January 1954, pp. 822–830. This method utilizes a bistable magnetizable toroidal memory core having write and sense windings which thread the central aperture, with a transverse interrogate field, i.e., an externally applied field directed across the core's internal flux applied by a second low remanent-magnetization magnetic toroidal core having a gap in its flux path into which one leg of the memory core is placed. Application of an interrogate current signal on the interrogate winding threading the interrogate core's central aperture sets up a magnetic field in the gap which is believed to cause a temporary rotation of the flux of the memory core in the area of the interrogate core's air gap. This temporary alteration of the memory core's remanent magnetic state is detected by the sense winding, the polarity of the output signal indicative of the information stored in the memory core.

Another technique of achieving nondestructive readout of a magnetic memory core is that disclosed in the article "The Transfluxor," Rajchman and Lo, Proceedings of the IRE, March 1956, pp. 321–332. This method utilizes a "transfluxor" which comprises a core of magnetizable material of a substantially rectangular hysteresis characteristic having at least a first large aperture and a second small aperture therethrough. These apertures form three flux paths: the first defined by the periphery of the first aperture, a second defined by the periphery of the second aperture, and a third defined by the flux path about both peripheries. Information is stored in the magnetic sense of the flux in path 1 with nondestructive readout of the information stored in path 1 achieved by coupling an interrogate current signal to an interrogate winding threading aperture 2 with readout of the stored information achieved by a substantial or insubstantial change of the magnetic state of path 2. Interrogation of the transfluxor as disclosed in the above article requires an unconditional reset current signal to be coupled to path 2 to restore the magnetic state of path 2 to its previous state if switched by the interrogate current signal.

A still further technique of achieving nondestructive readout of a magnetic memory core is that disclosed in the article "Fluxlock-High Speed Core Memory" Instruments and Control Systems, Robert M. Tillman, May 1961, pp. 866–869. This method utilizes a bistable magnetic toroidal memory core having write and sense windings threading the core's central aperture and an interrogate winding wound about the core along a diameter thereof. Information is stored in the core in the conventional manner. Interrogation is achieved by coupling an interrogate current signal to the interrogate winding causing a temporary alteration of the core's magnetic state. Readout of the stored information is achieved by a bipolar output signal induced in the sense winding, the polarity-phase of the readout signal indicating the information stored therein.

A still further technique of achieving nondestructive readout of a magnetizable memory core is that disclosed in the article "Coincident-Current Non-destructive Readout From Thin Magnetic Films," Oakland and Rossing, Journal of Applied Physics, Supplement, vol. 30, No. 4, pp. 54S–55S, Apr. 1, 1959. This method utilizes a Bicore memory element comprising two open flux path cores of thin ferromagnetic material and are described as having single-domain properties. The term "single-domain property" may be considered the characteristic of a three-dimensional element of magnetizable material having a thin dimension which is substantially less than the width and length thereof wherein no magnetic domain walls can exist parallel to the large surface of the element. The Bicore element cores are designated the information core and the readout core. Both of these cores preferably exhibit single-domain properties providing single-domain rotation switching and possess the characteristic of uniaxial anisotropy so as to provide a magnetic "easy" axis along which the cores' remanent magnetization vectors shall reside when the external magnetizing force in the area of the cores is substantially zero.

The information core of the Bicore element is the core in which data is stored as a binary "1" or a "0", which binary "1" or "0" is denoted by the remanent magnetization vector thereof having a magnetic sense arbitrarily designated as being in the positive or negative state. The information core is preferably of such geometry and material that it exhibits coercivity substantially greater than that of the readout core. The readout core of the Bicore element is the core that is either switched, or not switched, by an interrogating pulse depending upon the data stored in the information core. Thus, the switching or nonswitching of the readout core is indicative of the binary data stored in the information core. The information core further provides an external remanent magnetic field substantially larger than that of the readout core such that the readout core is coerced by the information core's external remanent magnetic field to follow the magnetic state of the information core. The relative coercivities of these two cores are such that an interrogating pulse sets up a substantial magnetic field in the area of the readout core which switches the magnetization of the readout core but sets up an insubstantial magnetic field in the area of the information core which does not switch the magnetization of the information core. The term "switch" when used herein means driving the magnetic state of the core concerned from a point along the substantially horizontal portion of its hysteresis characteristic loop to a point substantially into its high permeability area or into its opposite state of magnetization, i.e., from positive or negative saturation. The arrangement of these two cores is such that in the area of the readout core the magnetic fields set up by the interrogating pulse is additive to or subtractive from the external remanent magnetic field set up by the information core. If in the area of the readout core the external remanent magnetic field set up by the information core is additive to the magnetic field set up by the interrogating pulse, the readout core is merely driven further into saturation and a consequent change in magnetic field thereabout is negligible. This driving of the readout core's magnetic state further into saturation with resulting negligible change in magnetic field thereabout results in a negligible output signal being developed in a coupled sense line. Conversely, if in the area of the readout core the external remanent magnetic field set up by the information core is subtractive from the magnetic field set up by the interrogating pulse, the magnetic field set up by the interrogating pulse having a substantially greater effect on the readout core than the external remanent magnetic field of the information core, the readout core's magnetization vector is driven from its positive remanent magnetic state and reversed into its negative remanent magnetic state. Upon cessation of the interrogating pulse, the effect of the external remanent magnetic field set up by the information core in the area of the readout core again takes effect and returns the readout core's magnetization vector to its initial positive remanent magnetic state associated with a stored binary "1" in the information core. The driving or switching of the readout core's magnetization vector from a first magnetic state to a second magnetic state and the consequent substantial change in magnetic field thereabout results in a relatively large output signal being developed in a coupled sense line. The A. V. Pohm et al. Patent Nos. 3,015,807 and 3,125,743 disclose the above described Bicore element utilizing longitudinal and transverse core axes and drive field relationships.

The present invention is an improvement of the above described nonrestructive readout elements, and in its preferred embodiment utilizes a memory cell comprising one open flux path core preferably exhibiting single-domain properties providing single-domain rotational switching (for the write-in process) and possessing the characteristic of uniaxial anisotropy so as to provide a magnetitc "easy" axis along which the core's remanent magnetization vector shall reside when the external magnetizing force in the area of the core is substantially zero. However, the core of the present invention may be composed of a plurality of discrete layers, each layer preferably possessing the characteristics described above. Thus, each multilayered core would provide the desired operating characteristics. As an example, in the preferred embodiment utilizing a core capable of exhibiting single-domain properties the thickness of such core is limited to a narrow range. As the thickness determines the cross-sectional area and thus the total flux (assuming a constant flux density in the core) a greater total flux (and consequently a higher intensity external remanent magnetic field) may be provided by a multilayered core while yet retaining single-domain properties. Nondestructive readout is achieved by the passing of an electron beam through an aperture in the core whereby the Lorentz force, across the aperture due to the magnetization of the core, deflects such electron beam in a first or second and opposite direction indicative of the informational state of the core. Suitable detector means on the opposite side of the aperture from the electron beam source detect the direction of the deflection of the electron beam and, consequently, the informational state of the core. Write-in may be achieved by any thin ferromagnetic film drive technique such as that disclosed in the Rubens et al. Patent No. 3,030,612. Although the preferred embodiment is directed toward a memory element comprising a thin ferromagnetic film core having single domain properties no such limitation is intended. It is apparent to one of ordinary skill in the art than any magnetizable memory element that provides the necessary deflecting Lorentz force may be utilized.

By providing a single core memory element there is provided a nondestructive readout memory element which is simple to fabricate by a vapor deposition process such as disclosed in the Rubens et al. Patent No. 2,900,282 and which may be assembled and operated as multielement devices as disclosed in the Rubens et al. Patent No. 3,030,612. Additionally, by the use of low coercive force materials, such as Permalloy, as the constituent ferromagnetic material for the core much lower drive fields may be utilized than in the above discussed Bicore element.

Accordingly, it is a primary objective of the present invention to provide an improved apparatus and method for permitting the nondestructive readout of a magnetic core by an electron beam while utilizing conventional write-in methods.

Another object of this invention is to provide a one core magnetic memory apparatus wherein the informational state of the core is determined by passing an electron beam through an aperture in the core and detecting the direction of deflection of the beam as indicative of the informational state of the core.

Still another object of this invention is the provision in a read-only memory system of an interrogating electron beam which is deflected in a predetermined direction as a function of the informational state of the interrogated core.

It is a further object of this invention to provide a magnetic memory apparatus that exhibits nondestructive readout by the application of an electron beam into the external remanent magnetic field of a magnetizable memory core.

These and other more detailed and specific objectives will be disclosed in the course of the following specification, reference being had to the accompanying drawings in which.

Figure 1:
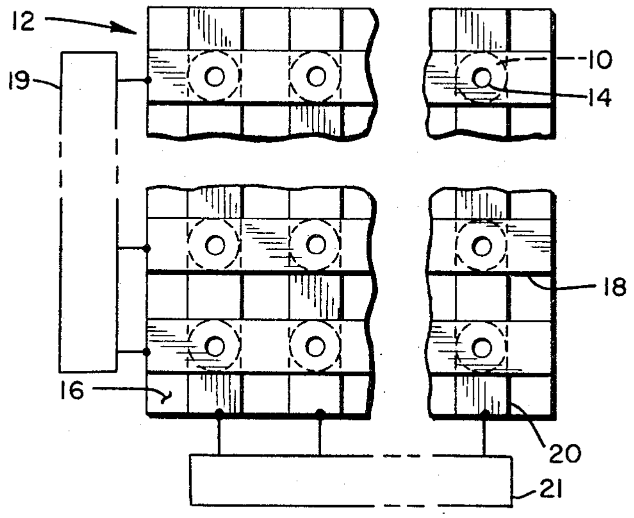
FIG. 1 is an illustration of a matrix array of thin ferromagnetic film cores and the write-in selection system of a preferred embodiment of the present invention.

With particular reference to FIG. 1 there is shown an illustration of a matrix array 12 of thin ferromagnetic film cores 10 and the write-in selection system of a preferred embodiment of the present invention. Memory, or matrix, array 12, except for the apertures 14 centrally located in the planar dimension of cores 10 and through the memory array 12, may be of any well known thin ferromagnetic film core memory plane arrangement, such a sandwiched array disclosed in the above referenced S. M. Rubens et al. Patent No. 3,030,612. In the preferred embodiment of the present invention cores 10 are elements of 81.5% Ni–18.5% Fe vapor deposited upon an 0.0030 inch thick glass substrate 16 and are approximately 1500 Angstroms (A.) in thickness and 0.015 inch in diameter. X and Y drive lines 18 and 20, respectively, are printed circuit type conductors of 0.000125 inch thick copper with insulators 22 formed of 0.00025 inch Mylar sheet. When required for structural support or as a ground plane substrate 16 may be of an electrical conducting sheet—such as aluminum—of minimum thickness for structural support with the cores 10 vapor deposited upon a minimum thickness SiO insulator.

Figure 2:
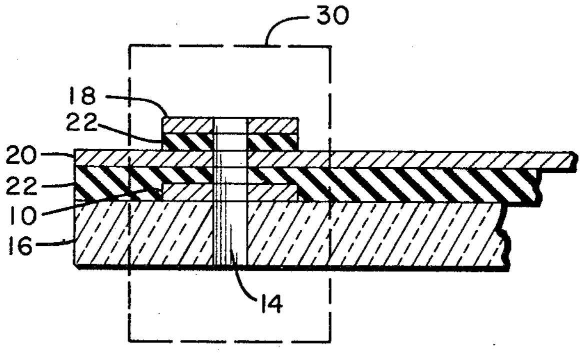
FIG. 2 is a cross-sectional view of one core of a memory cell of FIG. 1.

With patricular reference to FIG. 2 there is illustrated a cross-sectional view of one memory cell 30 of memory 12 of FIG. 1. The arrangement of FIG. 2 is presented as one of many possible memory cell ararngements, no limitation thereto intended. In this embodiment, as described above, with core 10 of 0.015 inch in diameter, aperture 14 is of 0.001 inch in diameter centrally located in the planar dimension of core 10 and passes through the entire stacked, integral arrangement of drive lines, insulators, core and substrate. In view of the above, it is apparent that the illustration of FIG. 2 is presented only for a better understanding of memory cell 30 and that the relative sizes of the different components of memory cell 30 are for illustrative purposes only with no intention of maintaining relative dimensions.

With reference back to FIG. 1 it is apparent that information may be selectively written into the cores 10 by any well known thin ferromagnetic-film drive technique such as a word-organized selection system. In this system, selector 19 may couple a transverse drive field to one selected drive line 18 while, concurrently, selector 21 may couple a longitudinal drive field of a first or of a second and opposite polarity to all of the drive lines 20. The cores 10, along the selected drive line 18, are set into a first or a second informational state as determined by the polarity of the inductively coupled longitudinal drive fields. Such selection system may be similar to that discussed in the publication "Magnetic Film Memory Design," J. I. Raffel et al., Proceedings of the IRE, January 1961, pp. 155–164.

Figure 3:
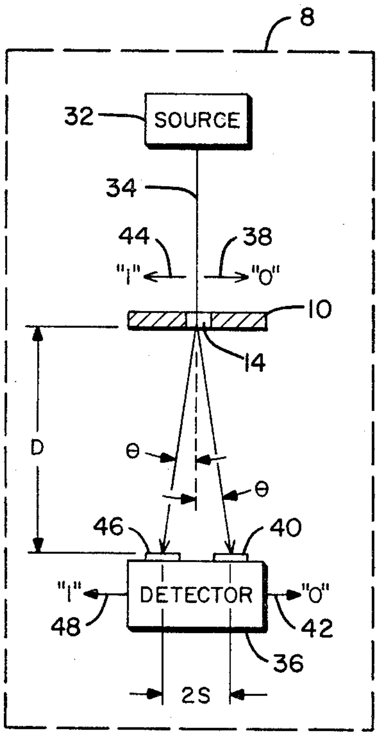
FIG. 3 is an illustration of a system providing a preferred method of nondestructive readout of the informational state of the core of a memory cell of FIG. 1.

With particular reference to FIG. 3 there is illustrated a system including an evacuatable enclosure, 8, providing a preferred method of nondestructive readout of the informational state of a core 10 of memory array 12. This system is comprised of source 32 of a narrow beam 34 of accelerated electrons directed normal to the plane of core 10 and focused to pass centrally through aperture 14. To interrogate the informational state of core 10 the beam 34 from source 32 is passed through aperture 14. As the electrons pass through the region containing the field of core 10, they are deflected by the Lorentz force which is proportional to $\vec{v}\times\vec{B}$ where $\vec{v}$ is the velocity of the electron and $\vec{B}$ is the external remanent magnetic field intensity of core 10 in the area of aperture 14. As the path of a charged particle in a uniform field $\vec{B}$ is circular, it is possible to determine the radium of curvature, $r$, by equating the Lorentz force for electrons, $eBv$, to the centripetal force $$mv^2/r$$

where $e$ is the electron charge and $m$ is the electron mass, respectively. The necessary assumptions for the proper application of this relationship are that the electron beam is directed normal to the plane of the film and that the $\vec{B}$ field from the core 10 is uniform. Consequently, we arrive at the relationship $$r=mv/eB$$

where $r$ is the radius in meters, $m$ is the mass in kilograms, $v$ is the velocity in meters per second, $e$ is the charge in coulombs and $\vec{B}$ is the flux density in webers/meter$^2$ (w./m.$^2$). The velocity $v$ of the electron can be given in terms of its accelerating voltage, V, by $$eV=\frac{1}{2}mv^2$$

or $$v=\sqrt{\frac{2eV}{m}}$$

where V is in volts. Combining these expressions we find that $$r=\sqrt{\frac{2mV}{eB^2}}=8.9\times10^{-5}V'$$

where V′ is in kilovolts and B is approximately 1.2 w./m.$^2$. If the distance that the field acts upon the electron is $t$, which we assume to be the thickness of the core, the amount of deflection will be given by the relationship $\theta=\arcsin t/r$ or for small angles $\theta=t/r$. For a core 1000 A. thick ($10^{-7}$ m.).

$$\theta=\frac{1.1\times10^{-3}}{V'}\text{ radians}$$

Since relativistic corrections have been ignored, this calculation is usable for electron energies of about 25 kilovolts and less.

With the above relationships and assuming that source 32 provides a beam 34 of electrons having an energy of 1 kilovolt, $\theta \simeq 10^{-3}$ radians. If detector 36 is situated one inch below core 10 the calculation for the amount of the deflection of beam 34 is $$S \simeq r\theta \simeq (10^3 \text{ mils}) \times (10^{-3} \text{ radians}) = 1 \text{ mil}$$

This deflection may be increased by using a beam 34 of electrons of a smaller energy. As an example, if a 1000 A. thick core were interrogated by a 100 volt electron beam, such beam would be deflected about 10 mils in a 1 inch separation. On the basis of the above calculations, using the beam 34 of electrons of an energy level of 100 volt electrons, a core 10 of 3000 A. thick 81.5% Ni–18.5% Fe composition, and a separation D between the core 10 and the detector 36 of 1.0 inch, the total deflection of the beam 34 at detector 36 would be 30 mils.

With core 10 set in a "0" information state as indicated by vector 38 of FIG. 3, beam 34 would be deflected to the right to impinge upon "0" detector 40 which in turn initiates a "0" signal at "0" output terminal 42. Conversely, with core 10 set in a "1" informational state as indicated by vector 44 beam 34 would be deflected to the left to impinge upon "1" detector 46 which in turn initiates a "1" signal at "1" output terminal 48.

It is understood that suitable modifications may be made in the structure as disclosed provided such modifications come within the spirit and scope of the appended claims. Having now, therefore, fully illustrated and described our invention, what we claim to be new and desire to protect by Letters Patent is set forth in the appended claims.

What is claimed is:

1. A memory system providing nondestructive readout of a magnetizable core, comprising:

a multistable-state open-flux-path planar core of thin ferromagnetic material having single-domain properties and possessing the characteristic of uniaxial anisotropy for providing an easy axis along which the core's remanent magnetization shall reside in a first or second and opposite informational state, said core having an aperture centrally located in and passing through the plane of said core;

a source of a narrow beam of collimated electrons, said beam directed normal to the plane of said core and focused to pass centrally through said aperture; and detector means located on the opposite side of said core from said source and responsive to said electron beam when passing through said aperture for providing signals indicative of the informational state of said core.

2. A memory system providing nondestructive readout of a magnetizable core, comprising:

a bistable open-flux-path planar core of thin ferromagnetic material having single-domain properties and possessing the characteristic of uniaxial anistropy for providing an easy axis along which the core's remanent magnetization shall reside in a first or second and opposite direction, said core having an aperture passing through the plane of said core;

a source of a collimated beam of electrons, said beam directed normal to the plane of said core and focused to pass through said aperture; and detector means located on the opposite side of said core from said source and responsive to said electron beam when said beam is effected by said core's magnetization as said beam passes through said aperture, said detector means providing signals indicative of said core's remanent magnetization direction.

3. A memory system providing nondestructive readout of a magnetizable core, comprising:

a bistable open-flux-path core of thin ferromagnetic material having single-domain properties and possessing the characteristic of uniaxial anisotropy for providing an easy axis along which said core's remanent magnetization shall reside;

said core set into one of two oppositely-directioned stable-states of substantially remanent magnetization along said easy axis;

said core having an aperture centrally located in and passing through the plane of said core;

a source of a narrow beam of accelerated electrons, said beam directed normal to the plane of said core and focused to pass centrally through said aperture;

the external remanent magnetic field in the area of said aperture due to the magnetization of said core being set into the first or the second of said stable-states deflecting said beam in a first or a second and opposite direction normal to said easy axis;

detector means located in back of said core from said source;

said detector means including first and second elements responsive to said beam when deflected in said first or second opposite direction normal to said easy axis, respectively;

said first element causing said detector means to emit a first signal indicative of said core being set into said first stable-state when said beam passes through said aperture and is deflected in said first direction normal to said easy axis to impinge upon said first element; and said second element causing said detector means to emit a second signal indicative of said core being set into said second stable-state when said beam passes through said aperture and is deflected in said second direction normal to said easy axis to impinge upon said second element.

4. A memory system providing nondestructive readout of a magnetizable core, comprising:

a bistable-state open-flux-path planar core having an easy axis along which said core's remanent magnetization shall reside;

said core set into one of two oppositely-directioned stable-states of substantially remanent magnetization along said easy axis;

said core having an aperture passing through the plane of said core;

a source of a collimated beam of electrons, said beam directed normal to the plane of said core and focused to pass through said aperture;

the external remanent magnetic field in the area of said aperture that is due to the magnetization of said core being set into the first or the second of said stable-states deflecting said beam in a first or a second and opposite direction normal to said easy axis;

detector means located in back of said core from said source;

said detector means including first and second elements responsive to said beam when said beam is deflected in said first or second opposite direction normal to said easy axis, respectively;

said first element causing said detector means to emit a first signal indicative of said first stable-state when said beam passes through said aperture and is deflected in said first direction normal to said easy axis to activate said first element; and said second element causing said detector means to emit a second signal indicative of said second stable-state when said beam passes through said aperture and is deflected in said second direction normal to said easy axis to activate said second element.

5. A method of providing the nondestructive readout of a magnetizable core having an easy axis along which said core's remanent magnetization shall reside in a first or a second and opposite informational state, said core having an aperture located in and passing through the plane of said core, said method comprising the steps of:

directing a beam of electrons normal to the plane of said core and through said aperture;

deflecting said beam in the area of said aperture in a first or second direction normal to said easy axis by the magnetization of said core that is set into the first or the second of said informational states, respectively; and detecting the direction of deflection of said beam as being indicative of the informational state of said core.

6. A method of providing the nondestructive readout of a magnetizable core of thin ferromagnetic material having single-domain properties and possessing the characteristic of uniaxial anisotropy for providing an easy axis along which said core's remanent magnetization shall reside in a first or a second and opposite informational state, said core having an aperture centrally located in and passing through the plane of said core, said method comprising the steps of:

directing a collimated beam of electrons normal to the plane of said core and through said aperture;

deflecting said beam in the area of said aperture in a first or second direction along said easy axis by the magnetization of said core being set into the first or the second of said informational states, respectively;

detecting the direction of deflection of said beam; and generating a signal indicative of the informational state of said core.

7. A memory system comprising:

a memory array comprising;

a planar substrate member;

a plurality of parallel X drive lines;

a plurality of parallel Y drive lines;

said X and Y drive lines oriented orthogonally for forming a plurality of XY drive line intersections;

a plurality of thin-ferromagnetic film cores each having single-domain properties and possessing the property of uniaxial anisotropy for providing an easy axis along which the core's remanent magnetization shall reside in a first or a second and opposite direction, one core oriented at each of said intersections;

said planar substrate member, said cores and said X and Y drive lines arranged for forming a stacked, integral memory array; and a plurality of apertures in said memory array, one aperture at each of said intersections and passing through the stacked X and Y drive lines, the core and the substrate member for forming a memory cell thereat;

means coupled to said X and Y drive lines for selectively setting the magnetization of said cores into a first or a second and opposite direction along said easy axis;

source means for directing a beam of electrons through a selected one of said apertures; and detector means located on the opposite side of said memory array from said source means and responsive to said electron beam when passing through said aperture for providing signals indicative of the informational state of the selected core.

8. A memory system comprising:

a memory cell including a stacked arrangement of drive lines, a planar thin-ferromagnetic film core having single-domain properties and possessing the characteristic of uniaxial anisotropy for providing an easy axis along which the core's remanent magnetization shall reside in a first or a second and opposite direction, and a planar substrate member;

an aperture passing through the stacked arrangement;

write means coupled to said drive lines for selectively setting the magnetization of said core into a first or a second and opposite direction along said easy axis; and read means including;

source means for directing a beam of electrons through said aperture;

detector means located on the opposite side of said memory cell from said source means and responsive to said electron beam when passing through said aperture for providing signals indicative of said core's remanent magnetization direction.

9. A memory system comprising:

a memory cell including a stacked arrangement of an open flux path, planar thin-ferromagnetic film core having an easy axis along which the core's remanent magnetization shall reside in a first or a second and opposite direction indicative of a corresponding informational state, two inductively coupled drive lines and a supporting substrate member;

an aperture passing through said memory cell;

write means coupled to said drive lines for selectively setting the remanent magnetization of said core along said easy axis in said first or second direction; and read means including;

source means for directing an electron beam to pass through said aperture;

detector means responsive to said electron beam when passing through said aperture for providing an indication of the informational state of said core.

10. The memory system of claim 12 wherein said thin-ferromagnetic film core is a deposited element having single-domain properties.

11. The memory system of claim 10 wherein said drive lines are printed circuit type copper conductors orthogonally arranged for providing an intersection at said memory cell.

12. The memory system of claim 11 wherein said detector means includes first and second elements located on the opposite side of said core from said source means for providing first and second signals indicative of said first or second informational state, respectively.

13. The memory system of claim 12 wherein said aperture is centrally located in the planar dimensions of said core and said intersection.

References Cited

UNITED STATES PATENTS

| | | | |
|---|---|---|---|
| 2,988,668 | 6/1961 | Lincoln et al. | 328—124 X |
| 3,050,653 | 8/1962 | Salinger | 313—84 X |
| 3,247,495 | 4/1966 | Fuller | 340—174 |
| 3,278,914 | 10/1966 | Rashleigh et al. | 340—174 |

TERRELL W. FEARS, *Primary Examiner.*

JOSEPH F. BREIMAYER, *Assistant Examiner.*

U.S. Cl. X.R.

313—84; 315—5.16, 5.27; 328—124

UNITED STATES PATENT OFFICE
CERTIFICATE OF CORRECTION

Patent No. 3,434,124 March 18, 1969

Arvid L. Olson et al.

It is certified that error appears in the above identified patent and that said Letters Patent are hereby corrected as shown below:

Column 7, lines 48 and 64 and column 9, lines 4 and 43, cancel "and", each occurrence.

Signed and sealed this 31st day of March 1970.

(SEAL)
Attest:

Edward M. Fletcher, Jr.
Attesting Officer

WILLIAM E. SCHUYLER, JR.
Commissioner of Patents